(12) United States Patent
Szita

(10) Patent No.: US 6,411,461 B1
(45) Date of Patent: Jun. 25, 2002

(54) DATA COLLECTION SYSTEM AND METHOD FOR ZERO ACCELERATION PATH CORRECTION

(75) Inventor: Gabor Szita, Santa Clara, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/243,574

(22) Filed: Feb. 3, 1999

Related U.S. Application Data

(60) Provisional application No. 60/073,531, filed on Feb. 3, 1998.

(51) Int. Cl.$^7$ ............................................. G11B 5/00
(52) U.S. Cl. ............................... 360/77.07; 360/77.04
(58) Field of Search ........................ 360/77.04, 75, 360/77.02, 77.05, 77.07, 77.08, 78.09

(56) References Cited

U.S. PATENT DOCUMENTS

| | | | | |
|---|---|---|---|---|
| 5,404,253 A | * | 4/1995 | Painter | 360/77.04 |
| 5,771,131 A | * | 6/1998 | Pirzadeh | 360/77.08 |
| 5,835,300 A | * | 11/1998 | Murphy et al. | 360/77.04 X |
| 6,097,565 A | * | 8/2000 | Sri-Jayantha et al. | 360/77.04 X |
| 6,115,203 A | * | 9/2000 | Ho et al. | 360/77.04 |
| 6,141,175 A | * | 10/2000 | Nazarian et al. | 360/77.04 |

* cited by examiner

Primary Examiner—Andrew L. Sniezek
Assistant Examiner—Mitchell Slavitt
(74) Attorney, Agent, or Firm—Derek J. Berger; Shawn B. Dempster

(57) ABSTRACT

A method of correcting track misregistration in a servo system for a disc drive including one or more discs includes positioning a head over a track located on a disc and maintaining the head centered over the track. The process for maintaining the head centered may include measuring the radial position of the head relative to the disc and determining correction factors for a zero acceleration path. Correction factors are determined by modeling an actuator transfer function to produce an estimated position signal. Subsequently, an estimated disturbance signal is determined by subtracting the measured position and the estimated position signal and filtering it with an adaptation filter. Thereafter, the estimated disturbance signal is subtracted from the measured radial position to produce a modified position measurement signal. The head is repositioned in accordance with the modified position measurement signal. In addition, a servo system for a disc drive which implements the method of correcting track misregistration is provided.

12 Claims, 3 Drawing Sheets

SAMPLES

DATA COLLECTION SYSTEM AND METHOD FOR ZERO ACCELERATION PATH CORRECTION

REFERENCE TO RELATED APPLICATIONS

This application claims the benefit of a U.S. Provisional Application having Ser. No. 60/073,531 filed on Feb. 3, 1998 and entitled "Data Collection Method for Zero Acceleration Path (ZAP) Correction."

FIELD OF THE INVENTION

The invention relates generally to the field of disc drives and more specifically to a method and apparatus for eliminating repeatable runout introduced during the servo track writing process and media imperfections in a disc drive.

BACKGROUND OF THE INVENTION

In general, disc drive storage systems record and reproduce information on a recording media. The media generally takes the form of a circular information storage disc having a plurality of concentric storage tracks. A disc drive system generally includes one or more information storage discs capable of magnetically storing information. The discs are rotated by a spindle motor mounted at the center of the disc or discs. The information is read and written to specific locations on the disc(s) using a magnetic (or optical) transducer, commonly known as a read/write head, that flies above the disc surface. Each head is carried over the media by an elongated flexure arm. The flexure arms can be vertically aligned and each is attached to a common head positioning assembly.

The head positioning assembly may be either rotationally mounted, or may take the form of a linear carriage that is free to move back and forth along a single axis. In rotary mounted head positioner assemblies, a voice coil motor rotates the head positioner assembly about a pivot mechanism to precisely position the head(s) relative to the recording media.

The precise positioning of the heads relative to the concentric tracks is typically accomplished by incorporating a closed-loop, electro-mechanical servo system. The implementation of the servo system may include a dedicated servo surface which is associated with one of the plurality of heads in the disc drive system. Alternatively, short bursts of pre-recorded servo data, referred to as a servo burst field, may be written amid the contents of the user data tracks. A servo track writer is employed to write the servo data and a control system monitors the servo surface or the servo burst field data to maintain the precise position of the heads relative to the concentric tracks of the disc(s). Various errors may be introduced during the servo track writing process that may cause track misregistration during the operation of the disc drive.

A significant error introduced by the servo track writer is track squeeze. Track squeeze occurs when the distance of two adjacent tracks written by the servo track writer is smaller than the specified track spacing at certain points. Vibrations during the servo track writing process can cause track squeeze. Track squeeze has to be accounted for as an uncertainty when specifying the track spacing of a disc drive, and therefore, track squeeze limits the maximum achievable track density.

In disc drives, a significant contributor to track misregistration is the repeatable runout written in by the servo track writer (SWRRO). Track misregistration can also be caused by media imperfections. Slight differences of the magnetic properties of the media over the disc surface may cause variations in the magnitude of the servo bursts read by the head. This, in turn, results in a position measurement error and track misregistration.

In FIG. 1, solid line 51 represents an ideal servo track. Dashed line 52 represents the track center after the servo write process. Because of various disturbances occurring during the servo write process and media imperfections, the track center is not smooth. A disc drive actuator typically would have difficulty following this path.

During the operation of the disc drive, a position measurement signal is generated at each servo burst, and fed into a control system. The control system computes a position error signal, which is equivalent to the deviation of the measured actuator position from the desired position. During track following, the position error signal is a direct measure of the track misregistration and includes repeatable and non-repeatable components. The repeatable component, referred to as the repeatable position error signal, includes the repeatable runout written in by the servo track writer (SWRRO), and the disturbance caused by media imperfections. The control system makes use of the position error signal to reposition the head.

If the non-repeatable position error component is neglected, the perfectly circular track center can be followed with zero actuator acceleration. When zero actuator acceleration is achieved (a zero acceleration path or ZAP), track squeeze and track misregistration may be significantly reduced. A basic principle of ZAP correction method is to subtract an appropriate correction factor from the position measurement signal at each servo sample. If the correction factors are determined appropriately, the original zigzag path becomes smooth, i.e. the track center becomes a perfect circle.

Any improvement achieved by subtracting correction factors from the position measurement signal is dependent on how accurately the correction factors are determined. Several procedures have been proposed to compute correction factor values. Most of these methods use inaccurate actuator models, and/or frequency domain computations. Thus, the calculations required by these techniques are complicated, and require many revolutions (usually more than 60) for each track.

The present invention provides a solution to this and other problems, and offers other advantages over the prior art.

SUMMARY OF THE INVENTION

In one aspect, the invention provides a method of correcting track misregistration in a servo system for a disc drive including one or more discs includes positioning a head over a track located on a disc and maintaining the head centered over the track. The step of maintaining includes measuring the radial position of the head relative to the disc and determining correction factors for a zero acceleration path. Correction factors are determined by modeling an actuator transfer function to produce an estimated position signal. Subsequently, an estimated disturbance signal is determined by subtracting the measured position and the estimated position signal and filtering it with an adaptation filter. Thereafter, the estimated disturbance signal is subtracted from the measured radial position to produce a modified position measurement signal. The head s repositioned in accordance with the modified position measurement signal.

Aspects of the invention include one or more of the following features. The estimated disturbance signal can be derived using the adaptation filter of Eq. 1:

$$w_n = w_{n-1} + \frac{v_{n-1}}{n} \quad \text{(Eq. 1)}$$

The raw estimated disturbance (the input of the adaptation filter) can be computed by subtracting an estimated position obtained through an accurate actuator model from the measured actuator radial position.

The disc drive includes a servo loop having a controller and the actuator, where the controller receives as an input the position error signal and outputs an actuator current signal which is coupled to the actuator. The actuator positions the head in accordance with the actuator current signal and outputs a position signal indicative of the radial position of the head relative to the disc. The step of deriving the Plant model includes determining the impulse response of the actuator including deconvolving the actuator current signal from the position signal.

The results of the deconvolving step can be used as coefficients of a finite impulse response filter. The impulse response can be differentiated to reduce the order of the Plant model. The differentiating step can be performed twice. This can include dividing the impulse response by $(z-1)^2$ to maintain the integrating property of the Plant model. Any linear trend in the actuator current signal can be removed before feeding it into the Plant model $\hat{P}(z)$ so as to minimize the effects of non-repeatable error in the position signal.

The step of removing any linear trend can include subtracting any linear trend from the actuator current signal such that a value of the actuator current signal at any sector on the disc is the same as a value at a same sector during a next revolution.

Any mean value of the actuator current signal can be removed before feeding it into the Plant model $\hat{P}(z)$ to minimize the effects of non-repeatable error in the position signal. Any linear trend can be removed from the estimated position signal before subtracting it from the measured position signal to compute the raw estimated disturbance.

The step of removing any linear trend can include subtracting a linear function from the estimated position signal such that a value of the estimated position signal at any sector on the disc is the same as a value at the same sector during a next revolution.

In another aspect, the invention provides a servo system for a disc drive. The servo system includes a controller and an actuator where the controller receives as an input a position error signal and outputs an actuator current signal to the actuator. The actuator controls a position of a head used in reading and writing data to a disc drive. The actuator includes an actuator output signal that is indicative of the position of the head. The servo system includes means for measuring position information representative of the radial position of the head including a repeatable error component. A processor is included for determining zero acceleration path correction factors. The processor includes an actuator model and disturbance estimator. The actuator model includes the transfer characteristics of the actuator. The disturbance estimator is operable to produce an estimated disturbance signal that is the sum of the position information and the estimated position signal. A means for subtracting the estimated disturbance signal from the position information to produce a modified position error signal is provided.

Advantages of the invention include one or more of the following. A method is provided to determine ZAP correction factors. The computations are easily implementable in a digital signal processor (DSP), and satisfactory accuracy is achieved within 10 revolutions. A system identification procedure is described that does not require any external equipment. The system identification technique results in a low-order discrete transfer function, which accurately matches both the high and low-frequency properties of the actuator.

The actuator model on each individual drive can be identified directly before initiating any ZAP data collection thereby significantly reducing the number of revolutions needed to achieve the desired accuracy. The correction technique simultaneously reduces the inaccuracies caused by modeling errors and non-repeatable disturbances.

These and various other features as well as advantages which characterize the present invention will be apparent upon reading of the following detailed description and review of the associated drawings.

DETAILED DESCRIPTION

Figure 1:
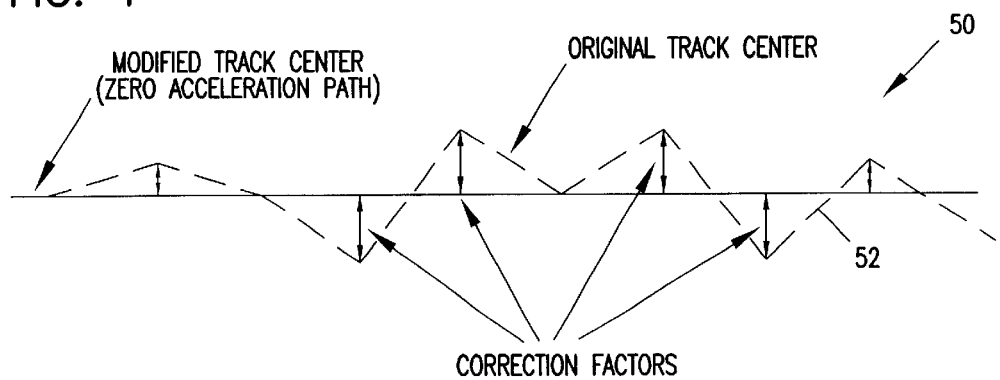
FIG. 1 is a schematic diagram of a servo track written by a prior art servo track writer.
Figure 2:
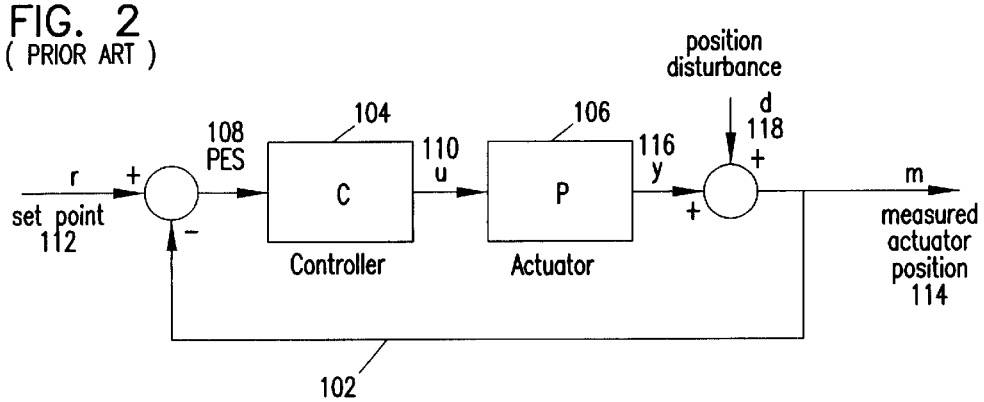
FIG. 2 is a schematic block diagram of a prior art disc drive servo system.

Referring to FIG. 2, a block diagram of a prior art disc drive servo system 100 is shown. The servo loop (generally indicated at 102) includes a controller 104 and actuator 106. The input to the controller 104 is a position error signal (PES) 108 and the output is an actuator current signal u 110. Position error signal 108 is the difference of a measured actuator position signal m 114 and a set point signal 112. The set point signal represents the desired position of the actuator and can be initialized to be equal to a zero value, or can be used to provide an offset or bias to controller 104.

Actuator current signal u 110 is coupled to actuator 106 and is used to position a head (not shown) over a disc or servo surface. The actuator includes a sensor (not shown) for reading servo data on a servo track and provides an output signal m 114 that is indicative of the position of the head. The measured actuator position m signal 114 is the sum of an actuator output signal y 116 and any position disturbance component (error embodied by position disturbance signal d 118). Position disturbance signal d 118 includes both repeatable and non-repeatable disturbance components. The measured actuator position signal m 114 is subtracted from the set point signal 112 closing servo loop 102.

Figure 3:
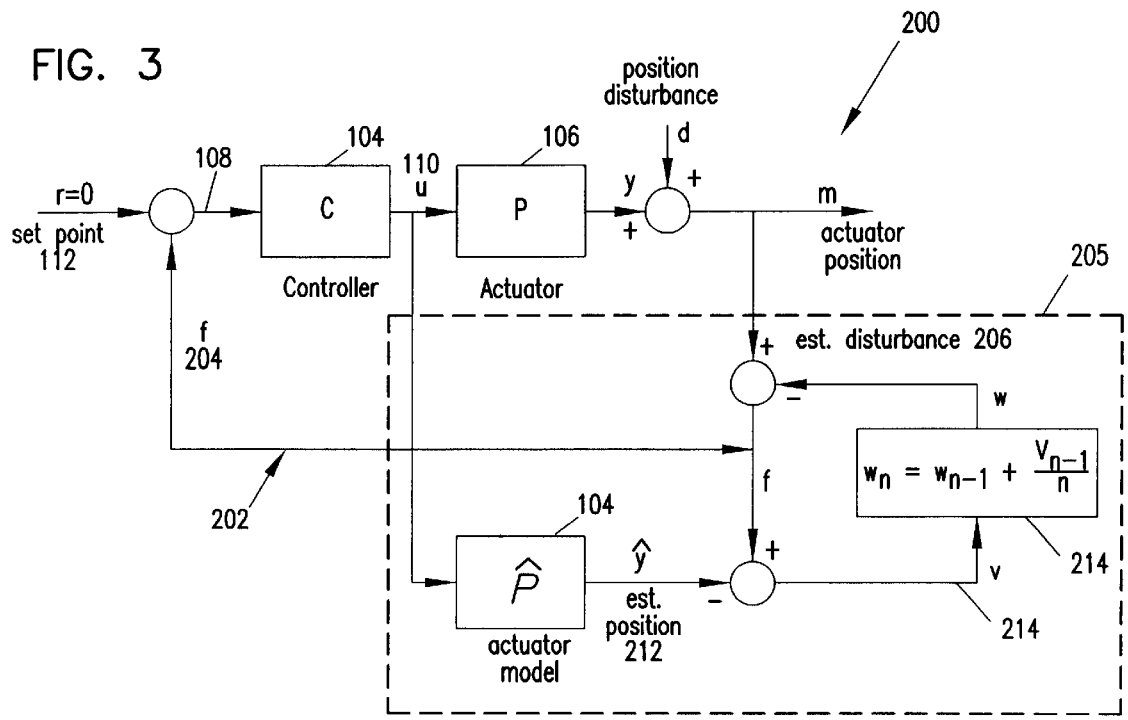
FIG. 3 is a schematic block diagram of a disc drive servo system implementing a ZAP data collection process.

Referring now to FIG. 3, a block diagram of a disc drive servo system 200 according to the invention is shown. The servo loop (generally indicated at 202) includes a controller 104 and actuator 106. The controller 104 includes an input, position error signal (PES) 108, and an output, actuator current signal u 110. Position error signal 108 is the difference of a corrected actuator position signal f 204 and a set point signal 112.

Actuator current signal u 110 is coupled to actuator 106 and is used to position a head (not shown) over a disc or servo surface. The actuator includes a sensor (not shown) for reading servo data on a servo track and provides an output signal m 114 that is indicative of the position of the head. The measured actuator position signal m 114 is the sum of an actuator output signal y 116 and any position disturbance component (error). The position disturbance can be represented by a position disturbance signal d 118 which is coupled with the actuator output signal y 116 to produce the measured actuator position signal m 114. The position disturbance signal d 118 has repeatable ($d_r$) and non-repeatable ($d_n$) components where, $d = d_r + d_n$.

An estimated disturbance signal w 206 is subtracted from the measured actuator position signal m 114, resulting in a corrected actuator position signal f 204. The corrected actuator position signal f 204 is subtracted from the set point signal 112 closing loop 202. A ZAP processor 205 provides the estimated disturbance signal w 206. The estimated disturbance signal w 206 represents the correction factors that are subtracted from the position measurement signal at each servo sample. The goal is to determine w such that it will cancel $d_r$, i.e.: $w = d_r$.

ZAP processor 205 includes an actuator model (implementing a Plant Model P'(z)) 208 and adaptation filter 210. Actuator current signal u 110 is fed into actuator model 208. The output of the actuator model is the estimated position of the actuator. Where the modeling error is small, the output of actuator model 208, estimated position signal y' 212, is approximately equal to actuator output signal y 116. The estimated position signal y' 212 is subtracted from the corrected actuator position signal f 204 to produce the raw estimated disturbance signal v 214 which is provided as an input into adaptation filter 210.

Adaptation filter 210 includes computations for calculating correction factors w. An estimated disturbance signal $w_n$ 206 is produced in accordance with the formula of Eq. 2:

$$w_n = w_{n-1} + \frac{v_{n-1}}{n} \tag{Eq. 2}$$

The subscript n denotes the number of complete revolutions of the disc since the beginning of the data collection procedure. Let $\hat{P}(z)$ denote the open loop transfer function of the actuator, and P' denote the mathematical model of the actuator implemented by actuator model 208. In the beginning of the data collection procedure n=0 and w=0. The modeling error $P_d$ may be described by Eq. 3:

$$\hat{P}(z) = P(z) + P_d(z) \tag{Eq. 3}$$

After the first revolution the estimated disturbance signal $w_1$ 206 is Eq. 4:

$$w_1 = v_0 = m_0 - \hat{y}_0 \approx d_0 \tag{Eq. 4}$$

Note that the numbers in the subscripts represent the number of complete revolutions of the disc since the beginning of the data collection procedure. After the second revolution Eq. 4 becomes Eq. 5:

$$w_2 = w_1 + \frac{v_1}{2} \approx w_1 + \frac{d_1 - w_1}{2} = \frac{w_1 + d_1}{2} \approx \frac{d_0 + d_1}{2} \tag{Eq. 5}$$

After the third revolution Eq. 5 becomes Eq. 6:

$$w_3 = w_2 + \frac{v_2}{3} \approx w_2 + \frac{d_2 - w_2}{3} = \frac{2w_2 + d_2}{3} \approx \frac{d_0 + d_1 + d_2}{3} \tag{Eq. 6}$$

After the fourth revolution Eq. 6 becomes Eq. 7:

$$w_4 = w_3 + \frac{v_3}{4} \approx w_3 + \frac{d_3 - w_3}{4}$$
$$= \frac{3w_3 + d_3}{4} \approx \frac{d_0 + d_1 + d_2 + d_3}{4} \tag{Eq. 7}$$

After n revolutions, the estimated disturbance signal $w_n$ 206 can be described by Eq. 8:

$$w_n = \frac{1}{n} \sum_{i=1}^{n} d_i \tag{Eq. 8}$$

After many revolutions w will cancel the repeatable disturbance $d_r$, because as w approaches infinity Eq. 8 becomes Eq. 9

$$\lim_{n \to \infty} w_n = d_r. \tag{Eq. 9}$$

In addition to reducing the error caused by the non-repeatable disturbances, the error estimating technique described above also reduces the error caused by the modeling inaccuracies, $P_d(z)$, after each revolution.

Determination of the Plant Model $\hat{P}(z)$

The convergence of the algorithm (i.e. the number of revolutions needed to achieve sufficient accuracy when evaluating Eq. 2) is highly dependent on the accuracy of the Plant Model, $\hat{P}(s)$. A simple double integrator where $\hat{P}(s) = K|s^2$, and where K is a constant, will yield poor convergence because the model does not account for the transient properties of actuator 106. A possible approach to overcome this problem is to measure the frequency response of actuator 106 and use a system identification technique to derive an approximate transfer function. However, this approach requires expensive instrumentation to measure the frequency response and may result in high order transfer functions.

To eliminate these problems, the following system identification technique is proposed in this invention.

Consider again the block diagram shown in FIG. 2. Let us set r=0, and average the actuator current signal u 110 and measured actuator position m 114 over several revolutions. Note that the averaging process has to be synchronized to the disc rotation so that the resulting signal will contain only repeatable components. The result of the averaging process may be described by Eq. 10:

$$u_a(z) = \frac{1}{n} \sum_{i=1}^{n} \frac{-C(z)d_i(z)}{P(z)C(z)+1} \approx -\frac{C(z)d_r(z)}{P(z)C(z)+1} \tag{Eq. 10}$$

$$m_a(z) = \frac{1}{n} \sum_{i=1}^{n} \frac{d_i(z)}{P(z)C(z)+1} \approx \frac{d_r(z)}{P(z)C(z)+1}$$

Next, a pulse is be applied at input r at a particular point in each revolution (e.g. at sector 0). The duration of the pulse can be chosen to be one sample time. The magnitude of the pulse can be chosen such that the magnitude of the response at the Position Error Signal (PES) 108 is approximately the same as the PES magnitude caused by the external disturbances (position disturbance d 118). For the system including the pulse at input r, we again measure the average of the actuator current signal u 110 and measured actuator position m 114 for several revolutions. The result is described as Eq. 11:

$$u_b(z) = \frac{1}{n}\sum_{i=1}^{n}\frac{-C(z)d_i(z) + C(z)r(z)}{P(z)C(z) + 1} \quad \text{(Eq. 11)}$$

$$\approx -\frac{C(z)d_r(z)}{P(z)C(z) + 1} + \frac{C(z)r(z)}{P(z)C(z) + 1}$$

$$m_b(z) = \frac{1}{n}\sum_{i=1}^{n}\frac{d_i(z) + P(z)C(z)r(z)}{P(z)C(z) + 1}$$

$$\approx \frac{d_r(z)}{P(z)C(z) + 1} + \frac{P(z)C(z)r(z)}{P(z)C(z) + 1}$$

Note that the averaging process has to be synchronized to the disc rotation so that the resulting signal will contain only repeatable components. The perturbing pulse inserted at input r results in the following responses show in Eq. 12 at u and m:

$$u_i(z) = u_b(z) - u_a(z) \approx \frac{C(z)r(z)}{P(z)C(z) + 1} \quad \text{(Eq. 12)}$$

$$m_i(z) = m_b(z) - m_a(z) \approx \frac{P(z)C(z)r(z)}{P(z)C(z) + 1}$$

Note that the responses to the perturbation, i.e. signals $u_i(z)$ and $m_i(z)$, are not influenced by the disturbances d.

Figure 4:
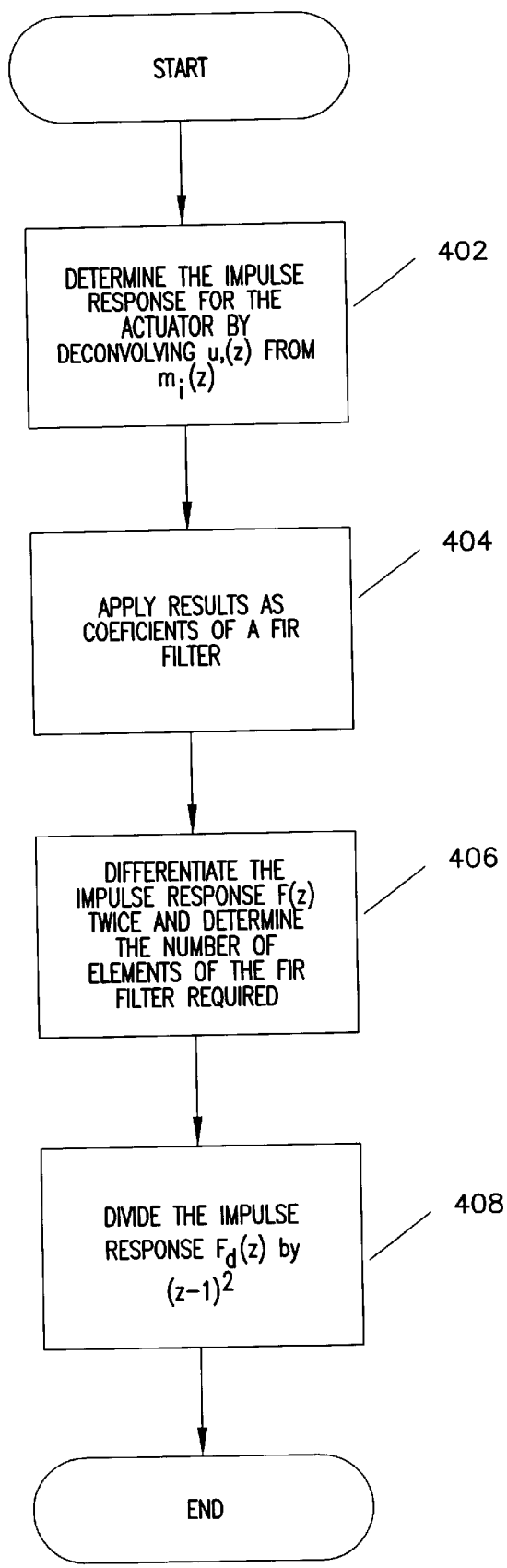
FIG. 4 is flow chart of a method for determining a Plant Model according to the invention.

Referring now to FIG. 4, a method 400 for approximating the Plant Model transfer function is shown. The impulse response of the particular actuator is obtained by deconvolving $u_i(Z)$ from $m_i(z)$ (402) which is described in Eq. 13 as:

$$F(z) = \text{deconv}(m_i(z), u_i(z)) \quad \text{(Eq. 13)}$$

The results of the deconvolution may be directly applied as coefficients of a finite impulse response (FIR) filter. The FIR filter can be used as an approximate plant transfer function. However, the transfer function P(z) of the disc drive actuator 106 contains a double integrating term. Accordingly, a high order FIR filter may be required to accurately match the low frequency behavior of actuator 106. Since the implementation of high order filters is difficult, the following simple procedure can be used to reduce the order of the Plant Model.

The integration of the impulse response F(z) can be removed by differentiating the impulse response twice (406) which is represented as shown in Eq. 14 as:

$$F_d(z) = \text{diff}(\text{diff}(F(z))) \quad \text{(Eq. 14)}$$

Figure 5:
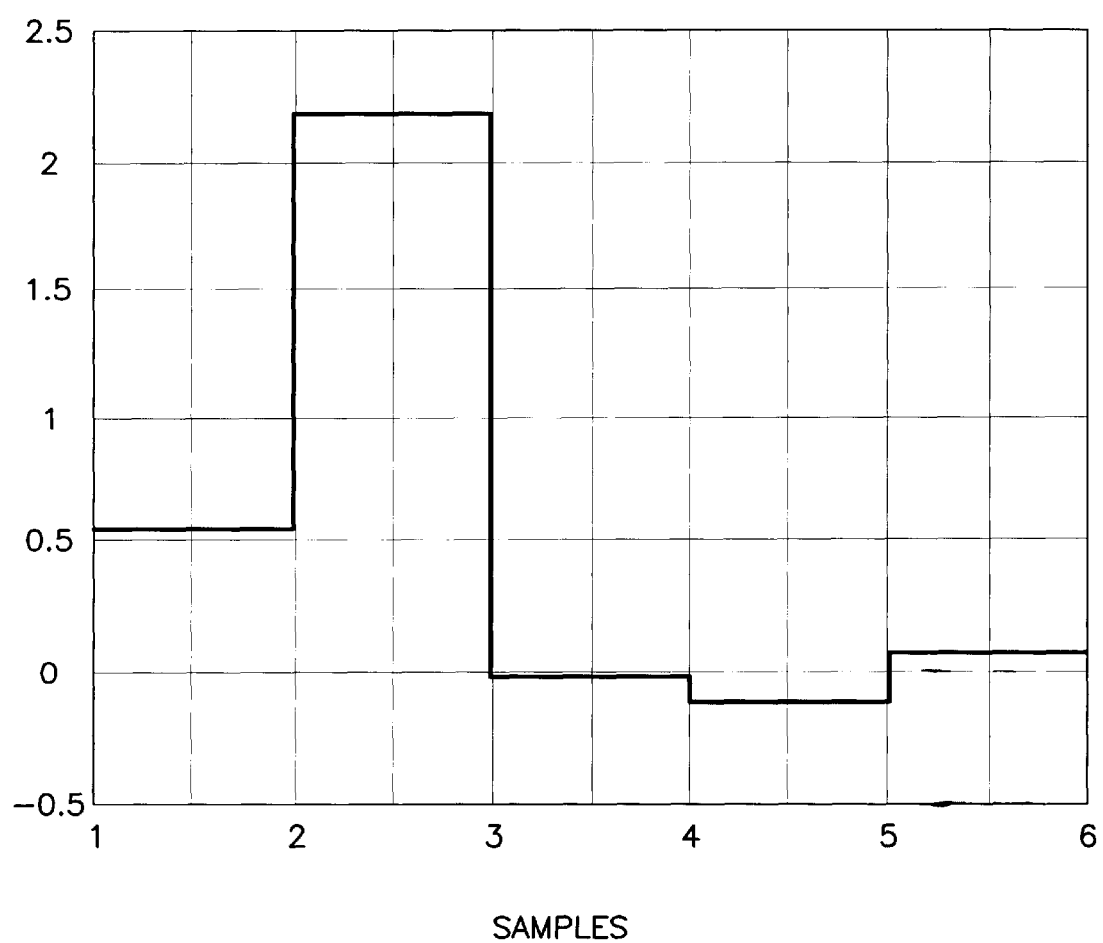
FIG. 5 is a plot of signal obtained after differentiating the impulse response of a particular actuator twice.

A typical plot of $F_d(z)$ is shown in FIG. 5 (for a Seagate Technology, Inc., ST 94330 disc drive). Note that the high frequency transients of the actuator settle down within a few samples. Thus, the transient properties of the actuator can be described by the first few elements of the impulse response $F_d(z)$. For example, in the case of the ST 94330 drive produced by Seagate Technology, Inc., sufficient accuracy is achieved by keeping the first two elements of $F_d(z)$, and neglecting all other elements.

In order to match the low frequency properties of actuator 106, the double integrating property of the Plant transfer function has to be preserved in the model. This can be easily accomplished by dividing $F_d(z)$ by $(z-1)^2$, where $F_n(z)$ denotes the first n elements of $F_d(z)$ (408). Thus the Plant model may be described by Eq. 15 as:

$$\hat{P}(z) = \frac{F_n(z)}{(z-1)^2} \quad \text{(Eq. 15)}$$

The system identification procedure can be performed on each drive to fine tune the coefficients of the actuator model on each individual drive.

Alternative Embodiments

The present invention can be easily implemented on a computer or on a DSP processor. Note, however, that the Plant model contains a double integrator and is unstable. Thus, a direct current (DC) offset or a linear trend in the signal u may lead to inaccurate results. Furthermore, the mismatch between the initial velocity of the actuator and the model may also cause inaccuracies. The method described above for determining the estimated actuator position may be modified to eliminate these problems.

Notice that in the physical drive the average linear trend of u is zero. Otherwise, u would grow to infinity, which is clearly impossible. However, non-repeatable disturbances may cause a momentary linear trend in u, which produces a third order trend in the signal $\hat{y}$. Therefore, the linear trend should be removed from u before filtering it with $\hat{P}(z)$. This can be accomplished by subtracting a linear trend from u such that the value of u at a particular sector is the same as the value at the same sector during the next revolution.

In the disc drive, the printed circuit card cable and the wind applies a constant torque disturbance to the actuator. Therefore, the mean value of u is usually not zero. Since the model does not include the torque disturbances, the DC offset can lead to a parabolic trend in the signal $\hat{y}$. To eliminate this problem, the mean value of u can be removed from u before filtering it with $\hat{P}(z)$.

The mismatch between the initial velocity of $\hat{P}$ and P can lead to an undesired linear trend in $\hat{y}$. Since the average linear trend of the physical actuator position y is zero, the error can be corrected by subtracting a linear trend from $\hat{y}$ such that the value of $\hat{y}$ at a particular sector is the same as the value at the same sector during the next revolution.

The procedure has been tested on a 2.5 inch disc drive with a track density of 10500 tracks per inch (TPI). It has been found that the track squeeze and the repeatable component of the position error signal decrease to approximately 20% of their original value in less than 10 revolutions.

The calculations are easily implementable in a DSP processor. It has been found that the repeatable component of the position error signal decreases to approximately 20% of its original value in less than 10 revolutions.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A method of correcting track misregistration in a servo system for a disc drive, the method comprising steps of:
   (a) positioning a head over a track located on a disc within the disc drive;
   (b) measuring a radial position of the head relative to the disc;

(c) determining correction factors for a zero acceleration path by:
- (c)(i) modeling an actuator transfer function to produce an estimated position signal;
- (c)(ii) determining an estimated disturbance signal by subtracting the measured radial position from the estimated position signal and filtering it with an adaptation filter; and
- (c)(iii) subtracting the estimated disturbance signal from the measured radial position to produce a modified position measurement signal; and (d) repositioning the head in accordance with the modified position measurement signal.

2. The method of claim 1 where the estimated disturbance signal $w_n$ is derived using the adaptation filter:

$$w_n = w_{n-1} + \frac{v_{n-1}}{n}$$

where, n denotes the number of complete revolutions; and v is the raw estimated disturbance signal.

3. The method of claim 2 wherein a raw estimated disturbance is computed by subtracting an estimated position obtained through an accurate actuator model from the measured actuator radial position.

4. The method of claim 1 wherein the disc drive includes a servo loop having a controller operatively coupled to an actuator, the controller being configured to output an actuator current signal in response to an input position error signal, the actuator being configured to position the head in accordance with the actuator current signal and to output a position signal indicative of a radial position of the head relative to the disc, and wherein the modeling step (c)(i) further comprises determining an impulse response of the actuator by deconvolving the actuator current signal from the position signal.

5. The method of claim 4 wherein the modeling step (c)(i) further comprises using the results of the deconvolving as coefficients of a finite impulse response filter that outputs the estimated position signal.

6. The method of claim 4 further wherein the modeling step (c)(i) further comprises twice differentiating the impulse response to reduce the actuator transfer function model order by two and dividing the impulse response by $(z-1)^2$ to maintain the integrating property of the model.

7. The method of claim 4 wherein the modeling step (c)(i) further comprises removing any linear trend in the actuator current signal before feeding it into the actuator transfer function model $\hat{P}(z)$ to minimize effects of non-repeatable error in the position signal.

8. The method of claim 7 wherein removing any linear trend comprises subtracting any linear trend from the actuator current signal such that a value of the actuator current signal at any sector on the disc is substantially identical to a value at a same sector during a next revolution.

9. The method of claim 4 further including removing any mean value of the actuator current signal before feeding it into the actuator transfer function model $\hat{P}(z)$ to minimize effects of non-repeatable error in the position signal.

10. The method of claim 3 further including removing any linear trend from the estimated position signal before subtracting it from the measured position signal to compute the raw estimated disturbance.

11. The method of claim 10 where removing any linear trend includes subtracting a linear function from the estimated position signal such that a value of the estimated position signal at any sector on the disc is substantially identical to a value at the same sector during a next revolution.

12. A servo system for a disc drive having a controller operatively coupled to an actuator, the controller being configured to output an actuator current signal in response to an input a position error signal, the actuator being configured to control a position of a read/write head relative to a disc in the disc drive by utilizing the actuator current signal and to output an actuator output signal indicative of the position of the head, the servo system comprising:

(a) a sensor which measures position information representative of a radial position of the head including a repeatable error component; and (b) a processor which determines zero acceleration path correction factors and replaces the position error signal in the controller with a modified position error signal derived by subtracting an estimated disturbance signal from the position information, the zero acceleration path correction factors including a model of transfer characteristics of the actuator which produces an estimated position signal and further including the estimated disturbance signal, the estimated disturbance signal being determined by subtracting the position information from the estimated position signal.

\* \* \* \* \*